Oct. 17, 1967 M. MORSE 3,347,753
GEOTHERMAL MEANS FOR DESALINATING SEA WATER
Filed Aug. 13, 1964 2 Sheets-Sheet 2

United States Patent Office 3,347,753
Patented Oct. 17, 1967

3,347,753
GEOTHERMAL MEANS FOR DESALINATING
SEA WATER
Milton Morse, 1 Horizon Road,
Fort Lee, N.J. 07024
Filed Aug. 13, 1964, Ser. No. 389,443
3 Claims. (Cl. 202—185)

ABSTRACT OF THE DISCLOSURE

A system for desalinating sea water utilizing the temperature differential between water at or near the surface of a large body of water, and water located adjacent the sea bottom, characterized in the provision of a power element and a still element, the power element supplying power to operate a pump, the pump creating reduced pressure for evaporating salt water, which is subsequently condensed as potable water.

---

This invention relates generally to the field of desalinating water, and more particularly to an improved means utilizing the temperature differential between water at or near the surface of a large body of water, and water located adjacent the sea bottom, in those locations where a substantial temperature differential exists.

With the increasing costs of desalinating water by conventional processes, and the increased requirements for water generally in arid areas, it has become increasingly apparent that resort has to be made either to atomic power, or sea temperature differentials to reduce the cost of desalination. At the present time, the cost is roughly $.40 per thousand gallons, to which must be added the cost of approximately $.08 per thousand gallons for pumping.

It is among the principal objects of the present invention to provide an improved desalination process which after initiation of operation may be substantially self-sustaining in the absence of externally applied power.

Another object of the invention lies in the provision of improved desalination means in which power extracted from temperature differential in the sea may be used for pumping as well as desalination.

Another object of the invention lies in the provision of an improved desalinating means which is operable on a substantially continuous basis, and in which the operation is independent of surface atmospheric conditions.

Still another object of the invention lies in the provision of improved desalinating means in which relatively little maintenance is required throughout a long period of operation.

Yet another object of the invention lies in the provision of an improved desalinating device in which the cost of fabrication, as contrasted with existing prior art devices, may be of a relatively low order, with consequent wide permitted use.

A feature of the invention lies in the fact that the device may be conveniently serviced without the necessity of placing a worker below sea level.

These objects and features, as well as other incidental ends and advantages, will more fully appear in the progress of the following disclosure, and be pointed out in the appended claims.

Figure 1:
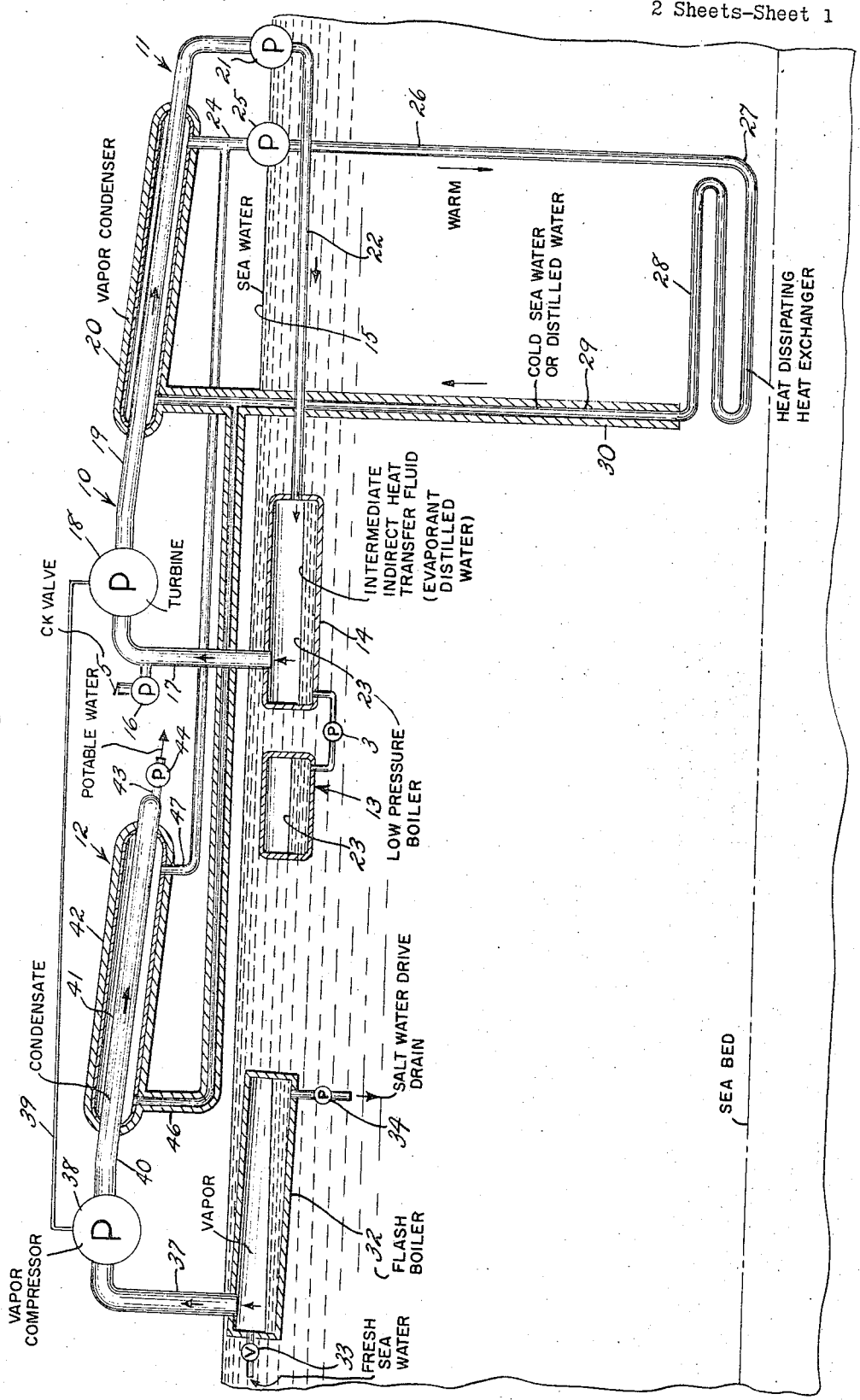

In the drawing, FIGURE 1 is a schematic view of an embodiment of the invention.

Figure 2:
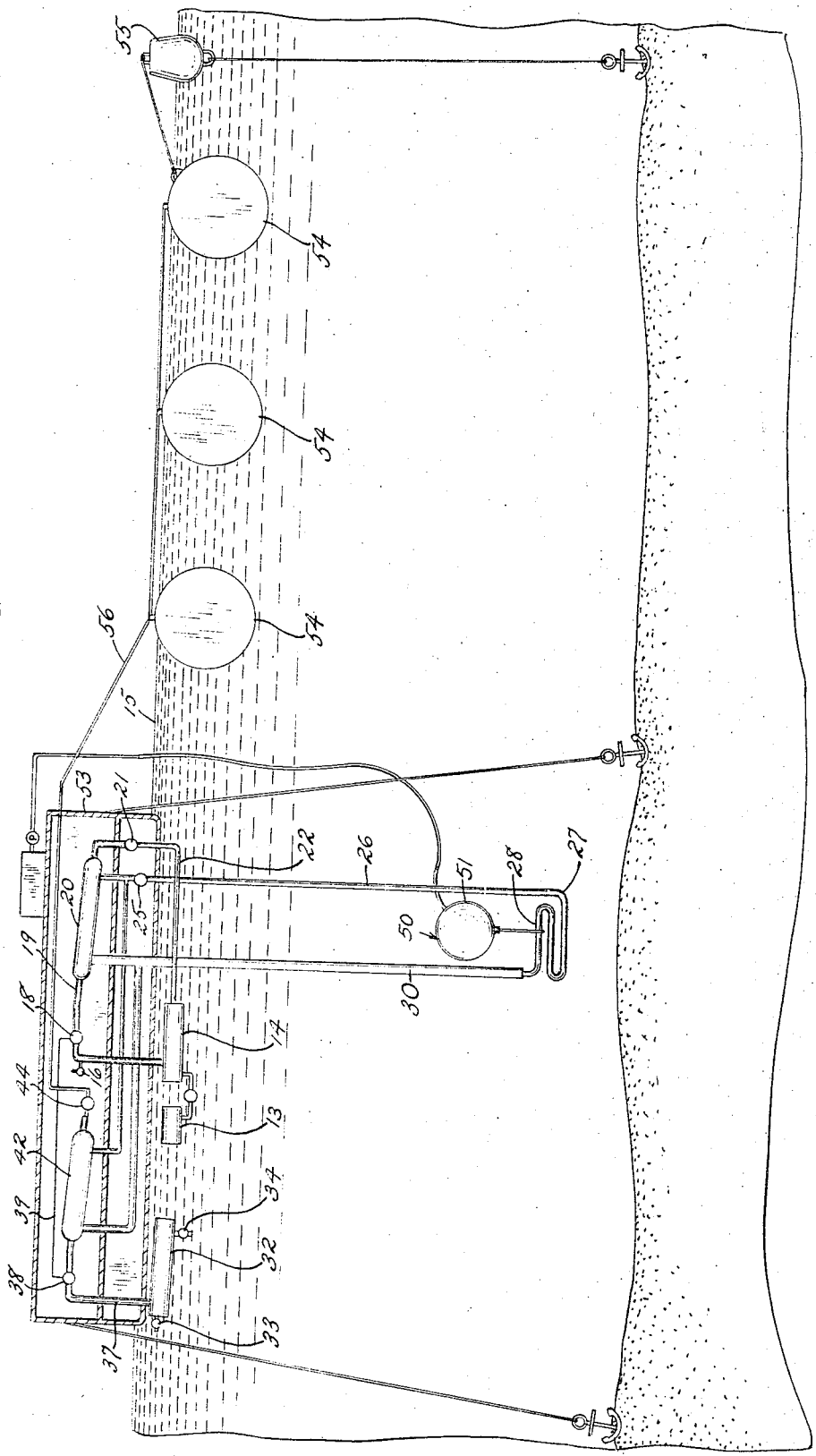

FIGURE 2 is a small scale view of an installation embodying the invention.

In accordance with the invention, the device, generally indicated by reference character 10, comprises broadly: a power element 11 and a still element 12.

The power element 11 includes a low pressure boiler 14 and storage tank 13 immersed just below the surface 15 of the sea water to be evaporated. It includes a means 16 in the form of a small pump for initially producing a vacuum, and a vapor conduit 17 leading to a low pressure high volume turbine 18. The exahust of the turbine is conducted through a tube 19 in turn leading to a condenser jacket 20, through a small circulating pump 21, and then to a pre-heating tube 22 also disposed below the surface 15, from where it again communicates with the boiler 14. The evaporant 23 is preferably a liquid such as distilled water which will boil readily at the temperature of the surface water under reduced atmospheric pressure. It will be noted that this evaporant travels in a closed circuit, and has no communication with the sea water, for the reason that should sea water be employed as an evaporant, the large amount of air dissolved in the same will soon nullify the vacuum initially produced by the means 16.

Referring to the condenser jacket 20, the same is provided with an outlet tube 24 communicating with a small circulating pump 25. Extending downwardly from the pump 25 is a vertical tube 26 preferably of flexible nature which continues to a location 27 just above the sea bed, where it in turn communicates with a heat exchanger 28. A second flexible vertical tube 29 is provided with insulating means 30, and conveys cold water up to the jacket 20. While it is possible to use actual sea water as a coolant, it is again preferable to use a closed system with distilled water or other non-corrosive coolant in the interest of preventing scale or gasses from accumulating within the jacket with extended use.

The still element 12 is located in the vicinity of the power element 11, and includes a second boiler 32 having a sea water inlet conduit and valve means 33 as well as a small brine ejection pump and valve means 34. Extending upwardly from the boiler 32 is a vapor conduit 37 leading to a low pressure high volume vacuum pump 38 driven through power linkage schematically indicated by reference character 39. This may be a direct mechanical connection, or the turbine may run a generator, and the pump is driven by an electric motor powered thereby. The exhaust conduit 40 of the pump 38 leads to a condenser tube 41 passing through a condenser jacket 42, and thence to a water take-off tube 43 which may include a pump 44 which would also be powered by the turbine 18, and thence to a distribution system for delivery to the area where the water will be used or stored. The condenser jacket 42 includes inlet and outlet means 46 and 47, respectively which communicate with the vertical tubes 24 and 29 to obtain a source of coolant for condensing purposes.

Operation of the power element 11 is commenced by placing the pump 16 into operation to produce an initial vacuum within the boiler 14. The check valve 5 will prevent the return of any outside air after the pump 16 is turned off. Next, the pump 3 is operated and the evaporant 23 which is stored in the auxiliary tank 13 will be conducted into the evacuated boiler 14. The vacuum in the boiler 14 will cause the evaporant 23 to boil, and the vapor pressure passing upwardly through the conduit 17 will run the turbine 18. The spent vapor is then conducted to the tube 19 where the condenser jacket 20 cools the same back to liquid form, and the small pump 21 then returns the now liquefied evaporant back to the boiler 14. Although the liquefied evaporant must be pumped back into the boiler 14, the volume of the liquid is smuch smaller than the volume of the vapor, hence a very small pump will suffice for this operation.

With the rotation of the turbine 18, the pump 38 is driven, to produced a vacuum in the second boiler 33 wherein the sea water disposed within that boiler will boil. The water vapor obtained thereby passes through the pump 38, and is compressed and cooled in the tube 41 from where it is pumped to the consumption areas. The air released from the sea water may be mixed back into the desalinated water or allowed to escape to the atmosphere. As the remaining brine increases in specific gravity, it may be drained, via the small brine ejection pump 34, and more sea water is permitted to enter the boiler as required through the valve means 33. Coolant is continuously circulated by the pump 21 which may also be driven from the turbine 18.

As the vertical tubes 26 and 29 are flexible, the heat exchanger 28 may be provided with flotation means 50 controlled from the surface of the water to bring the same to the surface for periodic servicing as required. This is most conveniently done by inflating a balloon 51 (see FIGURE 2) attached to the heat exchanger from the surface, preferably using a liquid of less specific density than the sea water.

Referring to FIGURE 2 in the drawings, the entire system can be installed on a barge or (floating platform) 53 which may be anchored in any area which is suitable for the most efficient operation of the system. As the requirements of certain areas (or seasons) vary, this floating fresh water supply system can be moved to meet those changing conditions and needs.

Since the system is built upon a floating island, the purified water may be stored in gigantic plastic bags 54 floating in the sea. These bags are anchored by a buoy 55, and connected through tubing 56 to the barge 53. In this manner, loss of the purified water by evaporation is eliminated, and water, when required is pumped ashore from the bags, the pumps (not shown) being located on the barge.

If fresh water is not the primary requirement, the output from the power element 11 can be coupled to an electric generator (not shown) to utilize the power of the turbine. I wish it to be understood that I do not consider the invention limited to the precise details of structure shown and set forth in this specification, for obvious modifications will occur to those skilled in the art to which the invention pertains.

I claim:

1. Means for desalinating sea water comprising: a power element and a still element; said power element including a low pressure, a high volume turbine, a boiler immersed in sea water substantially at the surface thereof, but isolated therefrom, and having a vapor output connected to said turbine, an evaporable liquid in said boiler, an indirect condenser connected to the turbine exhaust and to said boiler via a first pump, and heat exchanger means disposed at sea bottom connected in series with said condenser via a second pump; said still element including a second boiler immersed in sea water substantially at the surface thereof, said second boiler having sea water inlet means and brine drain means, a low pressure high volume vacuum pump driven by said turbine connected to the vapor space of said second boiler, and having an exhaust conduit, an indirect vapor condensing means surrounding the output of said vacuum pump, said vapor condensing means being connected in series with said exchanger means, and a pump in the heat exchanger means connecting between the condensers and the heat exchanger means.

2. Structure in accordance with claim 1, including means for pumping purified water ashore employing power generated in said turbine.

3. Structure in accordance with claim 1, including means for storing purified water communicating with said second boiler, said means including a series of plastic bags floating in the sea, substantially at sea level.

References Cited

UNITED STATES PATENTS

| 1,952,520 | 3/1934  | Urquhart     | 165—40   |
| 2,006,985 | 7/1935  | Claude et al.| 122—40   |
| 2,490,659 | 12/1949 | Snyder       | 202—205  |
| 2,636,129 | 4/1953  | Agnew        | 290—2    |
| 2,716,446 | 8/1955  | Ross         | 203—10 X |

FOREIGN PATENTS 152,753  10/1920  Great Britain.

NORMAN YUDKOFF, *Primary Examiner.*

J. SOFER, *Assistant Examiner.*